US006730159B1

United States Patent
Falaschi et al.

(10) Patent No.: US 6,730,159 B1
(45) Date of Patent: May 4, 2004

(54) CLINKER HYDRAULIC BINDER, USE AND METHOD FOR MAKING SAME

(75) Inventors: Jean-Pierre Falaschi, Le Teil (FR); Hervé Fryda, Villeurbanne (FR); Jean-Pierre Letourneux, Villefontaine (FR); Christopher Parr, Chatou (FR); Bruno Touzo, Voiron (FR); Michel Vialle, Crachier (FR)

(73) Assignee: Lafarge Aluminates, Paris Cedex 16 (FR)

( * ) Notice: Subject to any disclaimer, the term of this patent is extended or adjusted under 35 U.S.C. 154(b) by 0 days.

(21) Appl. No.: 09/890,144

(22) PCT Filed: Jan. 25, 2000

(86) PCT No.: PCT/FR00/00167

§ 371 (c)(1),
(2), (4) Date: Nov. 13, 2001

(87) PCT Pub. No.: WO00/44684

PCT Pub. Date: Aug. 3, 2000

(30) Foreign Application Priority Data

Jan. 26, 1999 (FR) .............................. 99 00842

(51) Int. Cl.$^7$ .................................................. C04B 7/32
(52) U.S. Cl. ........................ 106/692; 106/693; 106/801
(58) Field of Search ................ 106/692, 693, 106/801

(56) References Cited

U.S. PATENT DOCUMENTS 4,957,556 A * 9/1990 Kunbargi .................... 106/693
4,990,475 A * 2/1991 Matsumoto et al. ......... 501/120
5,316,571 A * 5/1994 Yamamura et al. .......... 106/692
6,113,684 A * 9/2000 Kunbargi .................... 106/692
6,406,534 B1 * 6/2002 Kunbargi .................... 106/692

FOREIGN PATENT DOCUMENTS

EP          0 535 233        4/1993
JP          09 278550        10/1997

OTHER PUBLICATIONS

Database WPI Section Ch, Week 198520 Derwent Publications Ltd., London, GB; AN 1985–119992, XP002118786 & JP 60 060985 A (Kurosaki Refractories CO), Apr. 8, 1985.
Database WPI Section Ch, Week 198013 Derwent Publications Ltd., London, GB; AN 1980–23035C, XP002118925 & JP 55 023004 A (Towa Taikakogyo KK), Feb. 19, 1980.
Chemical Abstracts, vol. 108, No. 4, Jan. 25, 1988, Columbus, Ohio, US; abstract No. 26264n, F. Tajima: "Spinel–based refractory linings".

* cited by examiner

*Primary Examiner*—Paul Marcantoni
(74) *Attorney, Agent, or Firm*—Young & Thompson (57) ABSTRACT

A clinker-type hydraulic binder obtained by burning comprising a magnesia spinel mineralogical phase and at least a calcium aluminate mineralogical phase, with a lime content less than 15% of the binder by dry weight. The magnesia spinel represents between 68% and 81% by dry weight of the binder and preferably the calcium aluminates consist essentially of CA and $CA_2$, with C=CaO and A=$Al_2O_3$. The invention also concerns the use of such a binder for making a refractory concrete and a method for making such a binder. The invention is useful for making steel ladles (1), preferably for their wear lining.

18 Claims, 5 Drawing Sheets

CLINKER HYDRAULIC BINDER, USE AND METHOD FOR MAKING SAME

The present invention relates to a clinker-type hydraulic binder obtained by burning comprising a magnesia spinel mineralogical phase and at least one calcium aluminate mineralogical phase, with a lime content of less than 15% of the binder by dry weight. It also relates to the use and a method of making such a binder.

Ladle steel metallurgy has developed these last years up to become a key point in the steel-manufacturing process. A ladle is a real chemical reactor with internal temperatures adapted to reach 1700° C. and being able to contain up to 300 tonnes of melted material. Conventionally used refractory concretes (first shaped, and then more and more monolithic) in steel ladles are not satisfactory any more and the performances thereof in such a field have to be improved.

In particular, the steel ladles contain wear linings in contact with steel and slag and more particularly exposed to slag infiltration and corrosion. Such wear linings should be able to best resist such aggressions.

More particularly there is an interest for monolithic concretes with low lime content (lower than 2.5% by dry weight in concrete) so-called LCC concretes (Low Cement Concrete), and with very low lime content (lower than 1% by dry weight in concrete) so-called ULCC concretes (Ultra Low Cement Concrete). The low lime content of such concretes is advantageous for obtaining a high refractoriness required for applications with steel ladles.

The Applicant has described in publication UNITECR'97, vol. III, pp. 1347–1354 (1997) of N. Blunt, C. Revais and M. Vialle entitled "Additives in calcium aluminate cement containing castables", a study over castable monolithic refractory concrete types based on a blend of aluminous cement and magnesian spinel, particularly with a low lime content. The magnesian spinel and calcium aluminates contained in the aluminous cement have therein functions of refractory component et hydraulic component.

The concretes being described in such a publication bring out difficulties to reach a satisfactory rheology and an easy implementation.

Other solutions have been proposed to make refractory concretes through a clinker based on magnesian spinel and calcium aluminates.

Thus, Patent FR-1,575,633 discloses an aluminous refractory cement produced from a blend of 30 to 50% dolomite and 50 to 70% calcined alumina by burning up to clinkerization or melting.

FR-2,043,678 is an addition certificate application attached to FR-1,575,633, which described an aluminous refractory cement based on magnesian spinel and calcium aluminates obtained from a blend of dolomite and calcined bauxite or calcined alumina, lime and magnesia, through burning up to clinkerization or melting.

Japanese Patent Application JP-8-198649 is per se relative to a composition of refractory cement or concrete based on a calcium aluminate material prepared from lime, alumina and magnesia, through melting and/or calcination.

The compositions of the three above-mentioned last documents have the inconvenient that they are not sufficiently well adapted for refractory applications in steel ladles, particularly for producing LCC or ULCC concretes able to resist slag infiltration in steel ladles and resulting corrosion.

The invention relates to a clinker-type hydraulic binder obtained by burning particularly adapted for producing steel ladles and having a very high resistance to slag infiltration and corrosion compared particularly to the known binders.

The binder according to the invention allows to produce refractory monolithic concretes LCC or ULCC based on magnesian spinel, making possible an implementation with very satisfactory reactivity (setting time) and rheology (fluidity, castability).

The invention also relates to the use of such a binder for making a refractory concrete.

It has also as an object a process for making such a binder, making possible an easy implementation from currently available raw materials and advantageously at a low burning temperature (lower than 1800° C.).

Other advantages associated with the binder according to the invention, besides the refractoriness and the resistance to slag infiltration and corrosion, include the following ones:

cancellation of the $12CaO.7Al_2O_3$ (so indicated $C_{12}A_7$), except possibly in a strongly underburnt clinker and only on a temporary basis, such phase being able to bring about stiffening difficulties in concrete formulations;

binder microstructure being advantageous for the milling thereof so as to reach high granular fineness, so improving the corrosion resistance;

very low content in free residual magnesia, i.e. non combined in magnesian spinel, so as to be able to prevent the generation of cracks due to free magnesia in brucite during the implementation step for the refractory concrete produced from the binder.

Thus, an object of the invention is a clinker-type hydraulic binder obtained through burning comprising:

a magnesian spinel mineralogical phase, and at least a calcium aluminate mineralogical phase with a lime content of less than 15% of the binder by dry weight.

According to the invention, the magnesian spinel comprises between 68% and 81% of the binder by dry weight.

Surprisingly such high proportions of the magnesian spinel allow to obtain the above-mentioned advantages, in particular good corrosion resistance properties.

By contrast, the known clinker-type binders comprising magnesian spinel and calcium aluminates and with a lime content of less than 15% have substantially lower magnesian spinel contents. In particular, FR-1,575,633 and FR-2,043,678 disclose proportions comprised between 25 and 45% magnesian spinel.

JP-8-198649 relates as per se to a binder with a lime content comprised between 15% and 30%, thus inappropriate for making LCC or ULCC concretes.

The term "clinker-type binder" means not only the proper clinker, thus the product before milling, but also the clinker being milled.

Such a clinker may be produced either at high temperature (higher than 1800°C.) by melting, for example in an electric oven, or advantageously through calcination (sintering) at low temperature (lower than 1800° C.).

Preferably, the binder is used for making concrete to which it gives magnesian spinel fine particles. The concrete formulation is then advantageously supplemented by fine reactive aluminas and by large magnesia spinel, as well as other granulates.

The high proportion of magnesian spinel in the binder allows to supply the total fine spinel of the concrete while preventing the problems encountered with a direct mixture of aluminous cement and magnesian spinel, as in UNITECR'97 above-mentioned. Moreover, the so-made concrete may have a low or very low lime content.

Preferably, the calcium aluminates are all under crystallized form.

More precisely, it is advantageous that the calcium aluminates should be essentially made of CA and $CA_2$, with CA being CaO and A being $Al_2O_3$.

Such a binder composition, with a pattern MA—CA—$CA_2$ (with M=MgO), leads to such a surprising and advantageously consequence that the presence of $C_{12}A_7$ is prevented, such a phase being adapted to lead to a stiffening cement.

Advantageously the calcium aluminates CA and $CA_2$ comprise between 19% and 32% of the binder by dry weight. More particularly it is strongly interesting the binder should comprise by dry weight of the binder:

71±2% MA (magnesian spinel)
18±2% CA, and
11±2% $CA_2$.

Such a composition is in thermodynamic equilibrium in the CaO—MgO—$Al_2O_3$ system, so that $C_{12}A_7$ cannot be present in this combination, except possibly in a strongly underburnt clinker and on a temporary basis.

In an alternative embodiment, the calcium aluminates are present under an amorphous form, particularly under a vitreous form.

Preferably, the binder is quasi-free from free residual MgO at least as it can be observed on X-ray diffraction spectrum for the binder.

Practically the X-ray diffraction technique allows to insure that the free magnesia is present in a lower proportion than 0.5% of the binder by dry weight.

Thus, the magnesia present in the raw material is almost combined into spinel. During the keramization step of a refractory concrete from the binder, since the hydraulic concrete dehydration may lead to a high steam pressure inside the concrete, crack generations due to the hydration of the magnesia into brucite are thus prevented.

By reference to UNITECR'97, the so-obtained concrete may further possess a particularly advantageously microstructure, since it comprises an intergranular matrix (between granulates of big size) formed with much finer grains. Such a property is due to the fact that the magnesian spinel in the binder can be easily milled and makes possible to produce very fine grains.

Preferably, the binder has the following chemical composition by dry weight of the binder:

| | |
|---|---|
| lime CaO | 4 to 12% |
| magnesia MgO | 19 to 23% |
| alumina $Al_2O_3$ | 69 to 74%. |

More specifically, the binder has advantageously the following chemical composition, by dry weight of the binder:

| | |
|---|---|
| lime CaO | 8.4% |
| magnesia MgO | 20.4% |
| alumina $Al_2O_3$ | 71.2%. |

The binder comprises advantageously a $SiO_2$ content of less than 0.5% of the binder by dry weight.

Preferably, the binder has a Blaine area surface at least equal to 3000 $cm^2/g$ and advantageously higher than 4000 $cm^2/g$.

This entity is measured according to the NF EN 196-6 standard. The binder comprises such characteristic after milling the clinker, the limit value indicated giving a preferred level of fineness of the grains which may be obtained with the binder according to the invention.

Another object of the invention is the use of a binder according to the invention for producing a refractory concrete.

Preferably, the binder is complemented by magnesian spinel, preferentially of large size, so that the concrete contains between 20% and 30% magnesian spinel by dry weight of the concrete.

Such spinel proportion is particularly advantageously, since it allows to obtain good resistances, both to corrosion and slag penetration.

More precisely the concrete is produced advantageously by mixing by dry weight of the binder:

between 16 and 27% of the binder,
between 2 and 13% of fine reactive alumina,
between 0 and 19% of large spinel, and
between 52 and 71% of alumina granulates.

In a particularly advantageous embodiment:

18% of the binder,
11% of fine reactive alumina,
11% of large spinel, and
60% of alumina granulates.

These proportions allow to produce a dense concrete with a theoretical compactness comprised between 0.25 and 0.40 because grain size lines are used that can suit to Andreasen mathematical model. The above-mentioned compositions authorize the proportion of 20% to 30% magnesian spinel.

In alternative embodiments, the reactive alumina being mixed with the binder is substituted by other materials.

The binder according to the invention is advantageously used in the manufacture of steel ladles, preferably for wear linings of such steel ladles.

The invention also relates to a process for producing a binder as defined above. According to the invention, the binder is made through frittering by burning of a blend of raw materials comprising dolomite, alumina and magnesia.

This blend, a source of CaO, MgO and $Al_2O_3$, has the advantage to give a very good sintering behaviour which can be appreciated by the quantity of uncombined magnesia staying after clinkerization.

Advantageously the raw materials have the following characteristics separately or in combination:

dolomite is natural: such dolomite leads, upon the decomposition thereof during the clinkerization, to the formation of very reactive products and has also the advantage to be economical;

alumina is metallurgical: such alumina has this advantage to be very reactive;

magnesia is reactive, preferably caustic, and has advantageously a grain size 100% lower than 100 μm, preferably lower than 40 μm: magnesia fine grain size is particularly interesting, since it favours a total combination of magnesia and consequently prevents residual magnesia to be present.

In two particularly advantageous embodiments, the following patterns are respectively used, where dolomite, alumina and magnesia are indicated by their tradenames:

Dolomite Samin—Alumina Sandy—Magnesia Briquette

Dolomite Samin—Alumina Pechiney—Magnesia MagChem40.

Preferably, before burning, the raw materials are milled up to a grain size corresponding to a 2% maximum rejection in a sieve of 65 µm.

This co-milling of the raw materials allows to accelerate the chemical reactions in a solid phase.

Burning is advantageously carried out at a temperature comprised between 1400°C. and 1600°C.

Such relatively low burning temperatures are advantageous in the industrial and economical fields.

Advantageously, the degree of progression for burning is evaluated by measuring the free magnesia content by dry weight of the blend, for example by R-ray diffraction.

Such a content is in fact representative of the clinkerization being made.

When the clinker-type binder has been obtained, it is preferably milled. It is then advantageously used for making magnesian spinel based concrete.

The present invention will be illustrated and better comprised through particular embodiments, but without limiting the invention, referring to the annexed drawings wherein.

A clinker-type binder, comprising magnesian spinel representing between 68% and 81% by dry weight of the binder and calcium aluminates, is used for producing a refractory concrete used for manufacturing a steel ladle. Such a steel ladle 1 (FIG. 1) of a substantially frustro-conical shape comprises a bottom 2, a side wall 3 and a cord 4 extending above the side wall 3. The steel ladle 1 is used for conveying melted metal, but may be provided with heating means to produce a heating 10 in the bottom 2. Such heating is for example carded out by induction. In an alternative embodiment, it is effected through dipping electrodes.

The edges 2, 3 and 4 of the steel ladle 1 comprise three successive linings 5, 6 and 7, from the inside to the outside of the ladle (FIG. 2), respectively a wear lining 5, an insulating lining 6 and a security lining 7.

Figure 2:
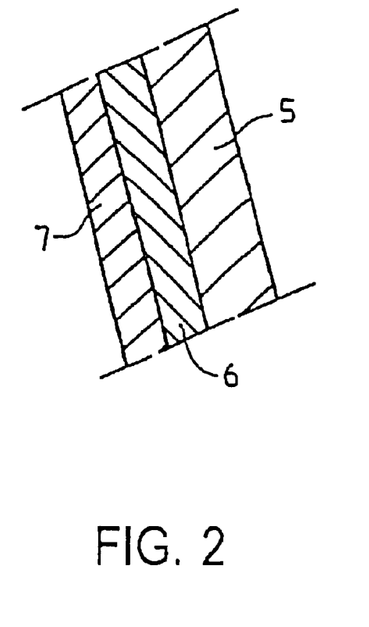
FIG. 2 shows an enlarged view of a part of the edges in the steel ladle of FIG. 1.

Each of the three zones comprising the bottom 2, the side wall 3 and the cord 4 is formed from a distinct refractory concrete adapted for the given zone. The wear lining 5 of the side wall and the bottom is made of concrete produced from the above-defined binder.

Figure 1:
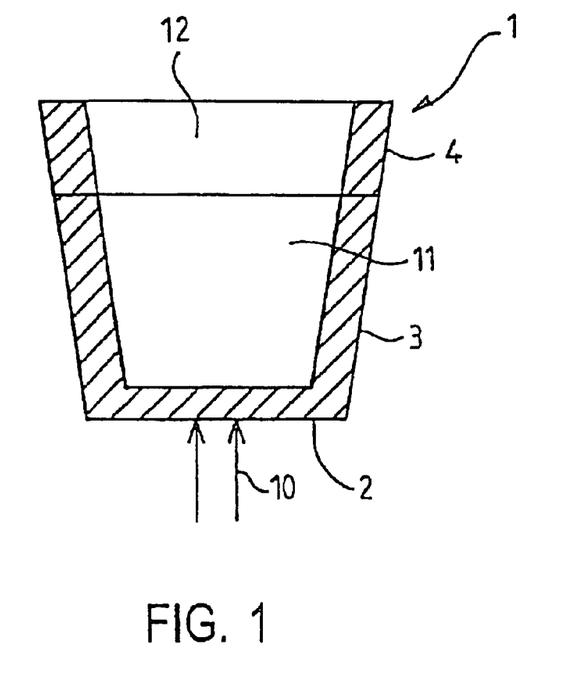
FIG. 1 shows in a longitudinal section a steel ladle manufactured for example with the binder according to the invention.

In operation, the steel ladle 1 is used by increasing temperature of melted steel 11 up to high values (can reach 1700°C.). Steel 11 in the steel ladle 1 is contained in a space limited by the bottom 2 and the side wall 3. It forms then above the steel 11 a slag 12 which is limited laterally by the cord 4.

Particular exemplary embodiments of the clinker-type binder are further detailed below.

EXAMPLE 1

23.4% by weight of dolomite Samin, 13.8% by weight of magnesia Nedmag, and 63.42% by weight of alumina Pechiney are used at start (by dry weight of the binder) and the blend is burnt during 5 hrs at 1450°C. The composition of the final product is determined by X-ray fluorescence (Table I).

TABLE 1

| Composition of the resulting clinker | | | | | |
|---|---|---|---|---|---|
| Composition | $SiO_2$ | $Al_2O_3$ | $Fe_2O_3$ | CaO | MgO |
| Percentage | 0.1 | 71.4 | 0.2 | 8.6 | 19.6 |

The study of the resulting clinker by X-ray diffraction shows that only the desired phases are present, namely CA, $CA_2$ and MA (with C=CaO, A=$Al_2O_3$ and M=MgO).

The importance of the selection of the raw materials is obvious from the following comparative trials.

A second clinker is made according to the same operating mode as the former, but with different raw materials: the alumina is substituted for by gibbsite (hydrated alumina) by using the following proportions:

17.2% by weight of dolomite Samin, 10.1% by weight of magnesia Nedmag, and 72.7% by weight of gibbsite, and the blend is burnt during 5 hrs between 1400° C. and 1600°C.

For both clinkers, the combination ratio of the phases is measured by the ratio of the surfaces of X-ray diffraction peaks for MgO and MA spinel.

The results are shown in Table II.

TABLE II

Comparison of MgO/MA ratios
(ratio of surfaces of X-ray diffraction peaks)

| Raw materials | MgO/MA |
|---|---|
| Dolomite/alumina/magnesia | 0.06 |
| Dolomite/gibbsite/magnesia | 0.35 |

Thus, it has been shown that the combination ratio of magnesia with alumina to form the spinel depends upon the raw materials being used. The selection of these ones is thus quite fundamental.

The spinel obtained in the binder of example 1 with the blend of dolomite/alumina/magnesia has quite fine grains compared to commercially available spinels on the market. That is illustrated by a comparison of particle diameters between the spinel in the above-mentioned binder and the spinel sold under the trade name ALCOA AR78 DIN70.

Figure 3:
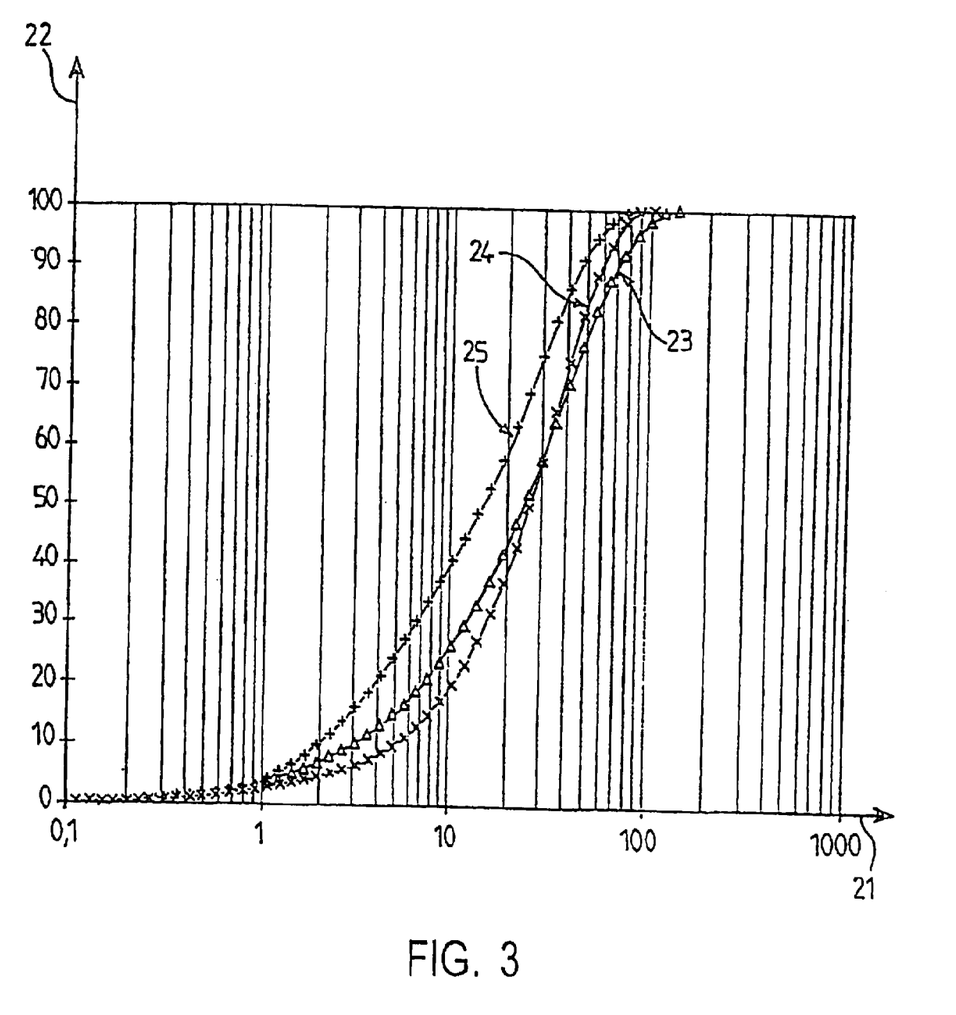
FIG. 3 shows the comparative grain size lines of the spinel of a binder according to the invention and of two common spinels.

Such a comparison is carried out through a measurement device sold under the trade name Malvern Mastersizer, (model S) by calling on MIE theory with "3QHD" presentation, the particularities of which are a particle refraction index of 1.729, a particle absorption index of 0.1 and a refraction index of 1.33 for the bearing liquid. Thus, three lines from 23 to 25 (FIG. 3) are drawn, giving respectively for known spinels (lines 23 and 24) and the spinel of the binder above (line 25), depending on the particle diameter expressed in μm (axis 21), the cumulated percentage of the total volume (axis 22). Consequently, it has been discovered that the spinel in the binder above comprises substantially smaller particles that those of known spinels.

EXAMPLE 2

A CMA clinker according to the invention is prepared from 23% dolomite, 13.5% magnesia and 63.5% alumina et the blend is burnt during 5 hrs at 1450°C. and a CMA clinker is obtained with the following comparison CaO: 8.4%
MgO: 20.4
$Al_2O_3$b: 71.2.

The X-ray diffraction diagram for the burnt clinker shows that only the three expected phases CA, $CA_2$ and MA are present.

A refractory concrete is made with such a clinker by mixing the following raw materials (Table III):

TABLE III

Raw materials for producing concrete

| Raw materials | Mass % |
|---|---|
| Coarse granulates of tabular alumina ALCOA T60(0–7 mm) | 61 |
| Granulates of spinel Haicheng Houyin Magnesite Products MAS 76 (<1 mm) | 11 |
| Reactive alumina fines ALCOA CT 3000 SG | 10 |
| CMA clinker above | 18 |
| Dispersants (mixture of polacrylates-Darvan 7C-and citric acid) | 0.1 |

These ingredients are mixed with 4.7% of water with respect to the concrete formulation.

Following properties of such a refractory concrete are measured:

a strong gas evolution of the concrete is observed, which shows that the concrete is assuming its location correctly without capturing air bubbles, so reducing the refractory porosity and then improving its resistance to slag corrosion;

concrete stiffening of the concrete takes place after 40 minutes.

Standard conventional mechanical tests and corrosion tests show that the concrete suits to good behaviour requirements for applications such as a wear lining in steel ladles.

Figure 4:
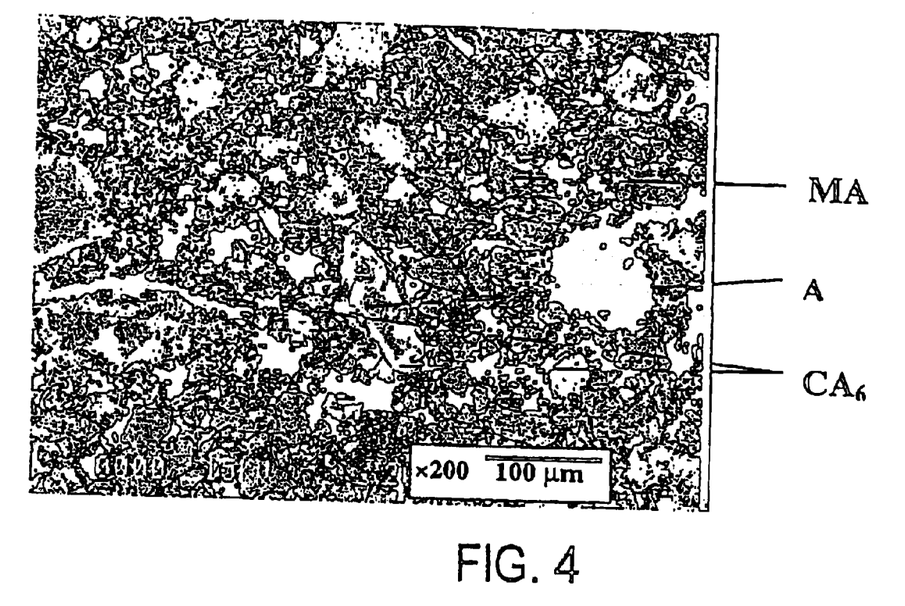
FIG. 4 is a picture showing in a 200× enlargement the microstructure after keramization of a known refractory concrete based on a direct blend of aluminous cement (commercially available under reference "S71") and magnesian spinel (as shown in Publication UNITECR' abovementioned)
Figure 5:
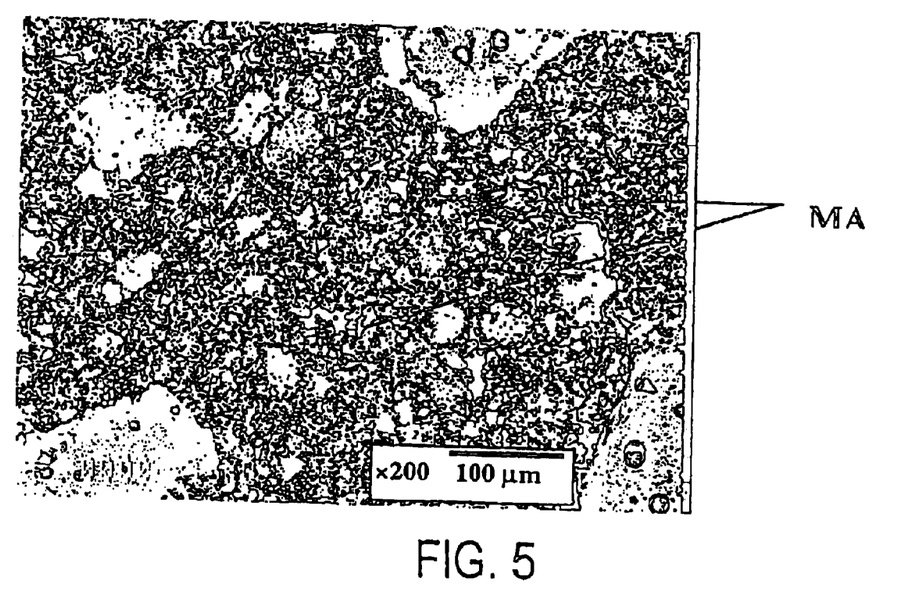
FIG. 5 is a picture showing with a 200× enlargement the microstructure after keramization of a CMA refractory concrete obtained from a binder according to the invention.

It can be also observed that the resulting concrete has a microstructure having an intergranular matrix made of very fine grains, particularly when compared with a refractory concrete obtained by directly mixing aluminous cement and magnesian spinel (FIG. 4 and 5).

In the following examples, the indications are as follows:

"CMA 72 binder", a cement containing 72% of MA, 17% of CA and 11% of $CA_2$ by dry weight of the binder (nominal composition) produced according to an industrial process, and "CMA 80 binder", a cement containing 80% of MA, 15% of CA and 5% of $CA_2$ by dry weight of the binder obtained experimentally.

Reference is also made to the aluminous cement known under the trade name Secar 71 for comparison.

The following annotations are used thereafter:

Alu Tab: tabular alumina,

Mesh: number of openings per inch on a sieve,

Alu React CT 3000 SG: reactive alumina commercially available under trade name CT 3000 SG in ALCOA company, Alu React P 152 SB: reactive alumina commercially available under trade name P 152 SB in PECHINEY company, HMP: fluidizing agent made of sodium hexametaphosphate, Chinese spinel: spinel commercially available in Haicheng Houyin company, S71: aluminous cement commercially available under trade name Secar 71, DARVAN 7 S: fluidizing agent.

EXAMPLE 3

Concretes based on CMA 72 and CMA 80 binders the compositions of which are given in Table IV and a concrete based on S71 binder the composition of which is given in Table V have been studied.

TABLE IV

Composition of CMA-based concrete

| | Concrete composition | |
|---|---|---|
| Reference | Content (%) | Quantity (g) |
| Alu Tab ¼–8 Mesh | 33.0 | 660 |
| Alu Tab 8–14 Mesh | 16.0 | 320 |
| Alu Tab 28–48 Mesh | 6.0 | 120 |
| Alu Tab <48 Mesh | 5.0 | 100 |
| Spinel 0.5–1 mm | 7.5 | 150 |
| Spinel 0–0.5 mm | 3.5 | 70 |
| ALU React CT 3000 SG | 11.0 | 220 |
| CMA 72 or 80 binder | 18.0 | 360 |
| TOTAL | 100.0 | 2000 |
| WATER | 5.3 | 106 |

TABLE IV-continued

Composition of CMA-based concrete

| Reference | Concrete composition | |
|---|---|---|
| | Content (%) | Quantity (g) |
| Sodium hexametaphosphate HMP | 0.080 | 1.60 |
| Boric acid | 0.010 | 0.20 |

TABLE V

Composition of S71-based concrete

| Reference | Concrete composition | |
|---|---|---|
| | Content (%) | Quantity (g) |
| Alu Tab ¼–8 Mesh | 33.0 | 660 |
| Alu Tab 8–14 Mesh | 16.0 | 320 |
| Alu Tab 28–48 Mesh | 6.0 | 120 |
| Alu Tab <48 Mesh | 5.0 | 100 |
| Spinel 0.5–1 mm | 9.0 | 180 |
| Spinel 0–0.5 mm | 4.0 | 80 |
| Spinel 0–0.09 mm | 10.0 | 200 |
| ALU React CT 3000 SG | 11.0 | 220 |
| S71 binder | 6.0 | 120 |
| TOTAL | 100.0 | 2000 |
| WATER | 5.3 | 106 |
| Sodium hexametaphosphate HMP | 0.080 | 1.60 |
| Boric acid | 0.010 | 0.20 |

Rheology and workability mentioned in Table VI are obtained.

TABLE VI

Rheology and workability of concretes

| | | Pouring test | | | | |
|---|---|---|---|---|---|---|
| Reference | Water | Vibrating table (mm) | | ASTM table (%) | | Working time |
| test | (%) | 0 mn | 30 mn | 0 mn | 15 mn | mn |
| S71 | 5.30 | 240 | 130 | 80 | 30 | 45 |
| CMA 72 | 5.30 | 230 | 180 | 65 | 40 | 45 |
| CMA 80 | 5.30 | 225 | 210 | 90 | 60 | 35 |

Table ASTM indicates a shock table for standard trials according to standard ASTM C230.

It has been discovered that concrete fluidities, represented by spreading measurements at different periods, are similar or higher in the case of CMA 80. Moreover, workabilities represented by the working time are identical, except for measurement uncertainties.

With a constant water content, adjuvantation for CMA 72 suits to CMA 80. It is to be noticed that the spinel enrichment of CMA 80 goes with a very significant fluidity gain. With a constant fluidity, the water content may be reduced. However, the concrete presents then a fall of mechanical performances (see example 5).

Such results show that the CMA 72 or 80 based concretes allow for a working time approximately equivalent to the one provided by the Secar 71 based solution.

EXAMPLE 4

Rheology and workability tests are made on the concrete of example 3 with CMA 72. The following trials implement two adjuvantations called respectively adj1 and adj2 and shown in Table VII. The results obtained for rheology and workability are given in Table VIII.

TABLE VII

Adjuvantations for concrete of example 3 (with CMA 72)

| | Composition of adjuvantation | | | |
|---|---|---|---|---|
| | adj1 | | adj2 | |
| Reference | Content (%) | Quantity (g) | Content (%) | Quantity (g) |
| Water | 5.3 | 106 | 5.3 | 106 |
| Sodium hexametaphosphate HMP | 0.080 | 1.600 | 0.080 | 1.600 |
| Boric acid | 0.010 | 0.200 | 0.015 | 0.300 |

TABLE VIII

Rheology and workability (adj1 and adj2)

| | | Pouring test | | | | |
|---|---|---|---|---|---|---|
| Reference | Water | Vibrating table (mm) | | ASTM table (%) | | Working time |
| test | (%) | 0 mn | 30 mn | 0 mn | 15 mn | mn |
| adj1 | 5.30 | 230 | 180 | 65 | 40 | 45 |
| adj2 | 5.30 | 220 | 185 | 70 | 30 | 50 |

Thus, it has been shown that the HMP content brings about concrete deflocculation and fluidity. Moreover, the boric acid addition does not make the workability longer significantly. The adj1 adjuvantation give thus a good compromise.

EXAMPLE 5

In such example, the results on the thermo-mechanical properties of concretes of example 3 through comparative tests with the concrete having a reference composition (S71 binder, that does not contain magnesian spinel) are given.

The mechanical performances of the concretes in cold conditions and after burning are given in Tables IX and X, wherein F and C are respectively the bending and compression resistances.

TABLEAU IX

Mechanical resistances in cold condition and after stoving

| | | Mechanical resistances (Mpa) | | | | | |
|---|---|---|---|---|---|---|---|
| | | In cold condition | | | | After stoving at 110° C. | |
| Reference | Water | F6h | C6h | F24h | C24h | F | C |
| test | (%) | | | | | | |
| S 71 | 5.30 | — | — | 5.3 | 57.7 | 12.8 | 100.7 |
| CMA 72 | 5.30 | 1.3 | 13.8 | 6.6 | 64.6 | 10.9 | 98.9 |
| CMA 80 | 5.30 | 0.6 | 9.6 | 4.6 | 36.9 | 10.2 | 83.1 |

TABLE X

Mechanical resistances after a thermal treatment and cold breaking

| Reference test | Eau (%) | Mechanical resistances after a thermal treatment and cold breaking (Mpa) | | | | | |
|---|---|---|---|---|---|---|---|
| | | F800° C. | C800° C. | F1100° C. | F1100° C. | F1500° C. | F1500° C. |
| S 71 | 5.30 | 9.8 | 87.3 | 13.1 | 77.6 | 47.3 | >168 |
| CMA 72 | 5.30 | 10. | 110.8 | 17.4 | 112.2 | 37.9 | >168 |
| CMA 80 | 5.30 | 9.9 | 105.0 | 16.4 | 111.2 | 32.4 | >168 |

It has been discovered that after a thermal treatment at 800° C., the mechanical resistances developed by the CMA are higher than those given by the S71. Moreover, concrete keramization takes place at a lower burning temperature with CMA binders than with S71 cement.

EXAMPLE 6

In this example, concrete slag corrosion has been studied. To do so, crucibles 30 (FIG. 6 and 7) are made in moulds so that each crucible 30 has a cubic shape with a width of I, one top side 32 of which is recessed with a cavity 31 forming a cylinder of a diameter d and a depth p. Dimensions I, d and p are for example respectively 100, 50 and 50 mm.

Concrete quantity required for making a bloc is 2.5 kg. For each test, two moulds are cast simultaneously. 5 kg of concrete are introduced into the bowl of Rayneri-type mixer, and then mixing water. Mixing is made at small speed. Mixing is then poured into the shaping moulds, then the recessing core is put in place. A vibration of the mixture is carried out during 1 minute so as to remove air bubbles. For setting, the samples are arranged in a humid cabinet during 24 hrs at 20° C. The cubes are then released, dried in a stove at 110°C. during 24 hrs, and then burnt in a muffle furnace at 1500° C. during 6 hrs so as to keramize them. As the surface condition of the cube walls is not perfectly smooth, a surface treatment is carried out in the recess bottom with a flat bottom auger. Such surface is a reference for measuring the corrosion effect.

Figure 6:
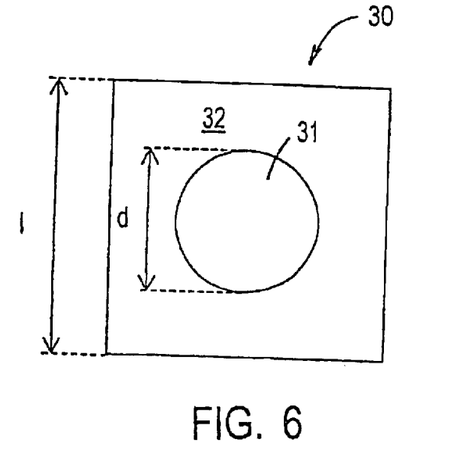
FIG. 6 is a top view of a crucible used for corrosion tests.
Figure 7:
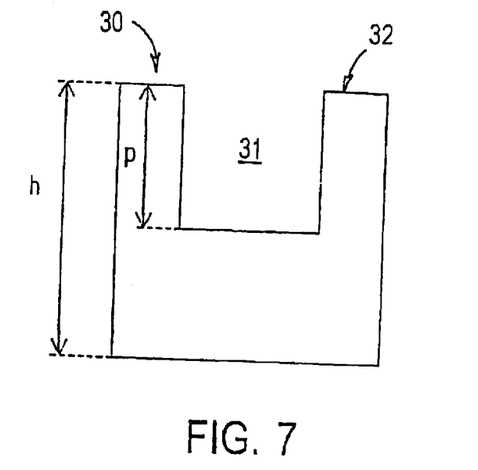
FIG. 7 is a side view in section through the crucible of FIG. 6.

The corrosion trial consists in putting the slag-containing crucibles 30 in a temperature-controlled furnace during 24 hrs. During this period, the slag corrodes the concrete of the crucibles 30.

Before treatment, the depth p of the cavity recess 31 is measured precisely on each crucible block through a metal rule. The cavity 31 is then filled with slag. The block is introduced into a muffle furnace, in an envelope in alumina filled itself with alumina powder to prevent the furnace deterioration in case where there would be a cracking of the crucible 30. As specified formerly, a thermal treatment is carried out at 1500° C. or 1600° C., with the following profiles:

profile 1: temperature rise of 100°C./hr up to 1500° C., holding time of 24 hrs, and then free fall down to 20° C.;

profile 2: temperature rise of 100°C./hr up to 1600° C., holding time of 24 hrs, and then free fall down to 20°C.

Figure 8:
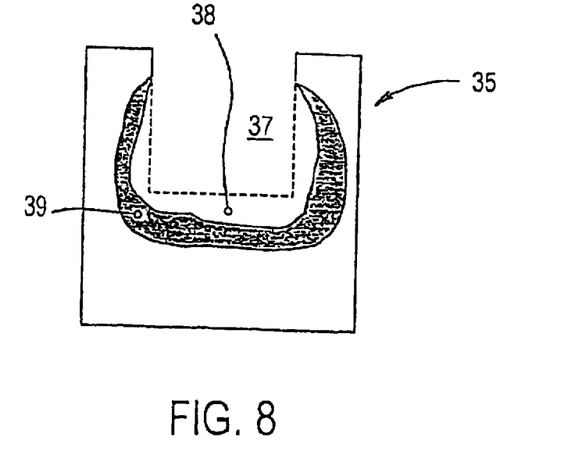
FIG. 8 represents a type profile through slag degradation of the crucible of FIG. 6 and 7.

After a thermal treatment, the resulting crucibles 35 have a cavity 37 (FIG. 8). They are chopped into two parts passing through the cavity centre 37. Typically, two discrete zones 38 and 39 are distinguished in the part damaged by the trial:

corrosion, i.e. the block part destroyed by the slag (zone 38), and impregnation, i.e. the penetration depth of the slag in the concrete (zone 39).

The corrosion is calculated by a depth difference cavity before and after thermal treatment (cavities 31 and 37). The impregnation is evaluated by measuring the slag penetration in various points of the crucible 30.

Concretes having the compositions indicated in the Table XI are submitted to such a test. The samples are called by names in three parts: the first one indicates the binder (S71, CMA 72 or CMA 80), the second one, alumina (A for ALCOA: CT 3000 SG, and P for PECHINEY: P 152 SB) and the third one, spinel (R for reference, H for HARBISON and Ch for Chinese).

TABLE XI

Compositions of LCC concretes alumina-spinel used for trials

| Raw materials | S71 A-R | CMA 72-A-R | CMA 72-A-H | CMA 72-A-Ch | CMA 72-P-R | CMA 72-P-H | CMA 72-P-Ch | CMA 80-A-R | CMA 80-A-H | CMA 80-P-Ch |
|---|---|---|---|---|---|---|---|---|---|---|
| Alumina | | | | | | | | | | |
| Alu Tab T60 ¼–8 Mesh Granul. | 33 | 33 | 33 | 33 | 33 | 33 | 33 | 33 | 33 | 33 |
| Alu Tab T60 8–14 Mesh | 16 | 16 | 16 | 16 | 16 | 16 | 16 | 16 | 16 | 16 |
| Alu Tab T60 28–48 Mesh | 6 | 6 | 6 | 6 | 6 | 6 | 6 | 6 | 6 | 6 |
| Alu Tab T60 < 48 Mesh | 5 | 5 | 5 | 5 | 5 | 5 | 5 | 5 | 5 | 5 |
| 0.5–1 mm | 9 | 7.5 | | | 7.5 | | | 7.5 | | |
| 0–0.5 mm | 4 | 3.5 | | | 3.5 | | | 3.5 | | |

TABLE XI-continued

Compositions of LCC concretes alumina-spinel used for trials

| Raw materials | S71 A-R | CMA 72-A-R | CMA 72-A-H | CMA 72-A-Ch | CMA 72-P-R | CMA 72-P-H | CMA 72-P-Ch | CMA 80-A-R | CMA 80-A-H | CMA 80-P-Ch |
|---|---|---|---|---|---|---|---|---|---|---|
| Spinel | | | | | | | | | | |
| R 78 0–0.09 mm | 10 | | | | | | | | | |
| Harbison 14 Mesh | | 11 | | | 11 | | | 11 | | |
| Chinese 0–1 mm | | | 11 | | | 11 | | | 11 | |
| Total added spinel | 23 | 11 | 11 | 11 | 11 | 11 | 11 | 11 | 11 | 11 |
| Alumina | | | | | | | | | | |
| CT 3000SG Reactive | 11 | 11 | 11 | 11 | | | | | | |
| P 152 SB | | | | | 11 | 11 | 11 | | 11 | 11 |
| Secar 71 | 6 | | | | | | | | | |
| Binder | | | | | | | | | | |
| CMA 72 | | 18 | 18 | 18 | 18 | 18 | 18 | | | |
| CMA 80 | | | | | | | | 18 | 18 | 18 |
| Total | 100 | 100 | 100 | 100 | 100 | 100 | 100 | 100 | 100 | 100 |
| Water | 5.3 | 5.3 | 5.3 | 5.3 | 5.3 | 5.3 | 5.3 | 5.3 | 5.3 | 5.3 |
| Adjuvants | | | | HMP 0.08 + boric acid 0.01 | | | | | | |

Figure 9:
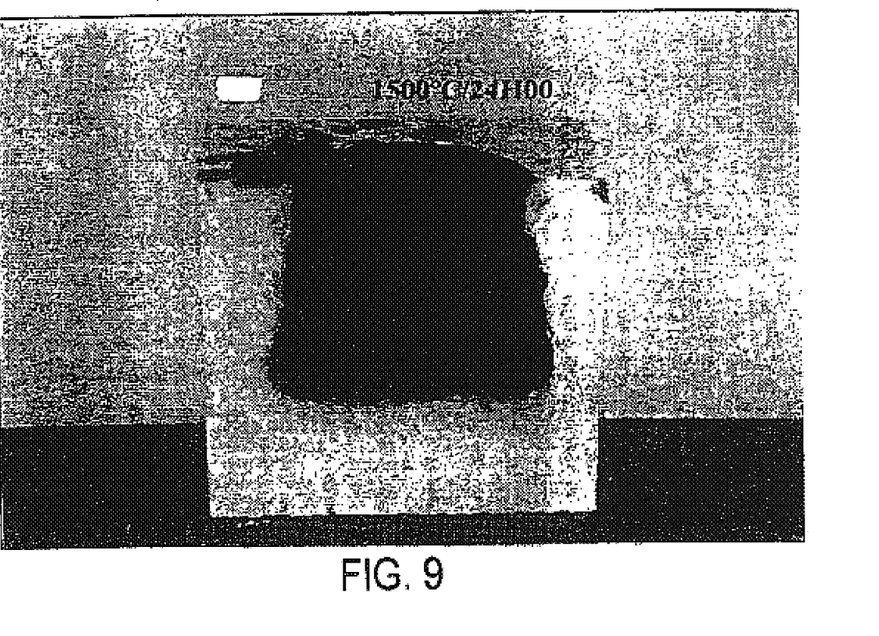
FIG. 9 is a picture of a first crucible after a corrosion test at 1500°C. and during 24 hrs.
Figure 10:
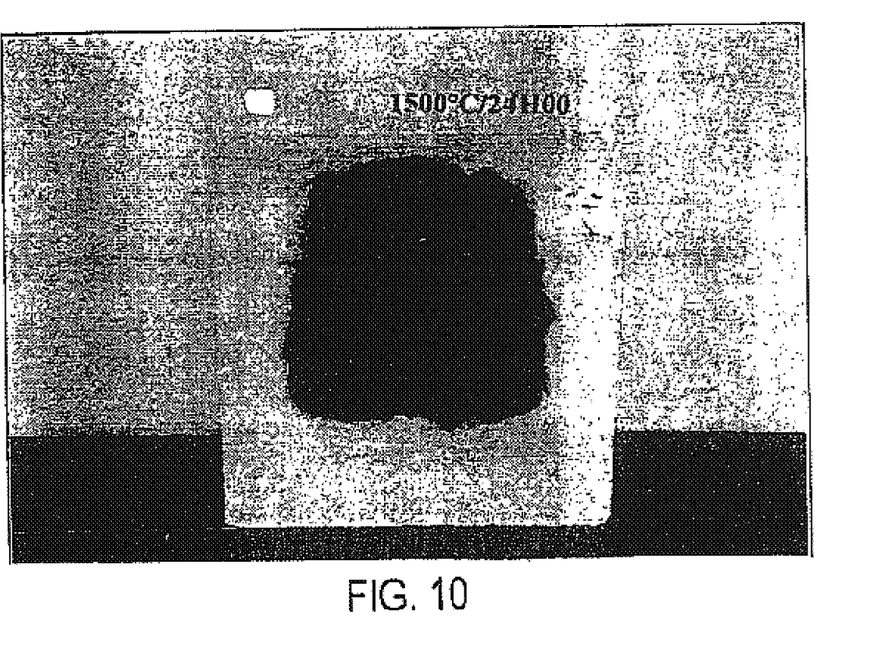
FIG. 10 is a picture of a second crucible after a corrosion test at 1500°C. and during 24 hrs.

The corrosion and impregnation thicknesses of the crucibles are reported in the Table XII. Moreover, it can be seen on pictures the condition of the crucibles after corrosion trials for S71-A-R (FIG. 9) et CMA 72-A-R (FIG. 10) at 1500° C. and 24 hrs.

Besides such observations, it is to be noticed that for the trials at 1600°C., which create particularly severe conditions, certain crucibles have visibly lost rapidly their content (identified by a star in the Table XII). The damaged thicknesses are thus smaller. However, at such a temperature, all the crucibles have finally been cracked and lost part of their content, except the crucible CMA 80-A-R. The cracks have appeared in the locations where the wall thickness is the smallest. At 1500°C./24 hrs, the degradation of the crucibles is much more significant. The crucibles are not cracked and hold their content.

TABLE XII

Corrosion tests (24 hrs) at 1500° C. or 1600° C.

| | 1500° C. | | 1600° C. | | |
|---|---|---|---|---|---|
| | Corrosion | Impregnation | Corrosion | Impregnation | Observations |
| S71-A-R | 3 mm | 2 mm | 5 mm | 5 mm | Cracked* |
| CMA 72-A-R | 3 mm | 0 mm | 8 mm | 10 mm | Very cracked |
| CMA 72-A-H | 4 mm | 1 mm | — | — | |
| CMA 72-A-Ch | 6 mm | 1 mm | | | |
| CMA 72-P-R | 5 mm | 1 mm | | | |
| CMA 72-P-Ch | 5 mm | 1 mm | 5 mm | 15 mm | Very cracked |
| CMA 72-P-H | 5 mm | 0 mm | 8 mm | 5 mm | Very cracked |
| CMA 80-A-R | | | 4 mm | 8 mm | Very cracked |
| CMA 80-P-Ch | | | 6 mm | 2 mm | Not cracked |
| | | | 4 mm | 5 mm | Cracked* |

TABLE XII-continued

Corrosion tests (24 hrs) at 1500° C. or 1600° C.

| | 1500° C. | | 1600° C. | | |
|---|---|---|---|---|---|
| | Corrosion | Impregnation | Corrosion | Impregnation | Observations |
| CMA 80-P-H | | | 7 mm | 6 mm | Cracked* |

°Rapid cracking → Flowing of slag out of the crucible and a small interaction.

At 1500° C., the formulations present all a small degradation, although the thicknesses are slightly weaker for the CMA-containing formula CMA 72-A-R. The substitution of the control spinel and/or the reactive alumina CT 3000 SG by other products does not modify the corrosion resistance properties. At 1600° C., these observations stay valid at the observable level.

Such results show the formulation flexibility for CMA compared to the raw materials. Such modifications do not create significant degradations for the properties of the concretes. Moreover, a CMA containing 80% of spinel also presents advantageous corrosion resistance characteristics.

What is claimed is:

1. A hydraulic binder obtained through burning, said binder comprising:
    a magnesium spinel mineralogical phase, and
    at least a calcium aluminate mineralogical phase with a lime content of less than 15% of the binder by dry weight,
    wherein the magnesium spinel comprises between 68% and 81% of the binder by dry weight, and the calcium aluminates are essentially made of CA and $CA_2$, with C=CaO and A=$Al_2O_3$, and comprise between 19% and 32% of the binder by dry weight.

2. The binder according to claim 1, comprising by dry weight of the binder, 71±2% of magnesium spinel, 18±2% Ca and 11±2% $CA_2$.

3. The binder according to claim 1, which is substantially free from free residual MgO, at least as can be observed upon X-ray diffraction spectrum for the binder.

4. The binder according to claim 1, having the following chemical composition by dry weight of the binder:

| | |
|---|---|
| lime CaO | 4 to 12% |
| magnesia MgO | 19 to 23% |
| alumina $Al_2O_3$ | 69 to 74%. |

5. The binder according to claim 1, having the following chemical composition by dry weight of the binder:

| | |
|---|---|
| lime CaO | 8.4% |
| magnesia MgO | 20.4% |
| alumina $Al_2O_3$ | 71.2%. |

6. The binder according to claim 1, further comprising a $SiO_2$ content of less than 0.5% of the binder by dry weight.

7. The binder according to claim 1, having a Blaine area surface at least equal to 3000 $cm^2/g$.

8. A method of using a binder according to claim 1 for producing a refractory concrete.

9. A method of using a binder according to claim 8, wherein said binder includes magnesium spinel in an amount between 20% and 30% of magnesium spinel by dry weight of the concrete.

10. A method of using a binder according to claim 8, wherein the concrete is produced by mixing by dry weight of the binder:

between 16 and 27% of the binder, between 2 and 13% of fine reactive alumina, between 0 and 19% of magnesium spinel, and between 52 and 71% of alumina granulates.

11. A method of using a binder according to claim 8, wherein said binder is used in the manufacture of steel ladles for wear linings of such steel ladles.

12. A process for producing a binder according to claim 1, wherein said binder is made through frittering by burning of a blend of raw materials comprising dolomite, alumina and magnesia.

13. A process according to claim 12, wherein said dolomite is natural.

14. A process according to claim 12, wherein said alumina is metallurgical.

15. A process according to claim 12, wherein said magnesia is reactive and has a grain size less than 100 $\mu$m.

16. A process according to claim 12, wherein the raw materials are, before burning, milled up to a grain size corresponding to a 2% maximum rejection on a sieve of 65 $\mu$m.

17. A process according to claim 12, wherein said burning is carried out at a temperature comprised between 1400° C. and 1600° C.

18. A process according to claim 12, wherein the degree of progression of said burning is evaluated by measuring the free magnesia content by dry weight of the mixture.

* * * * *